INVENTORS
SHERMAN H. CREED
JAMES L. REIMERS
BY Hans G. Hoffmeister
ATTORNEY

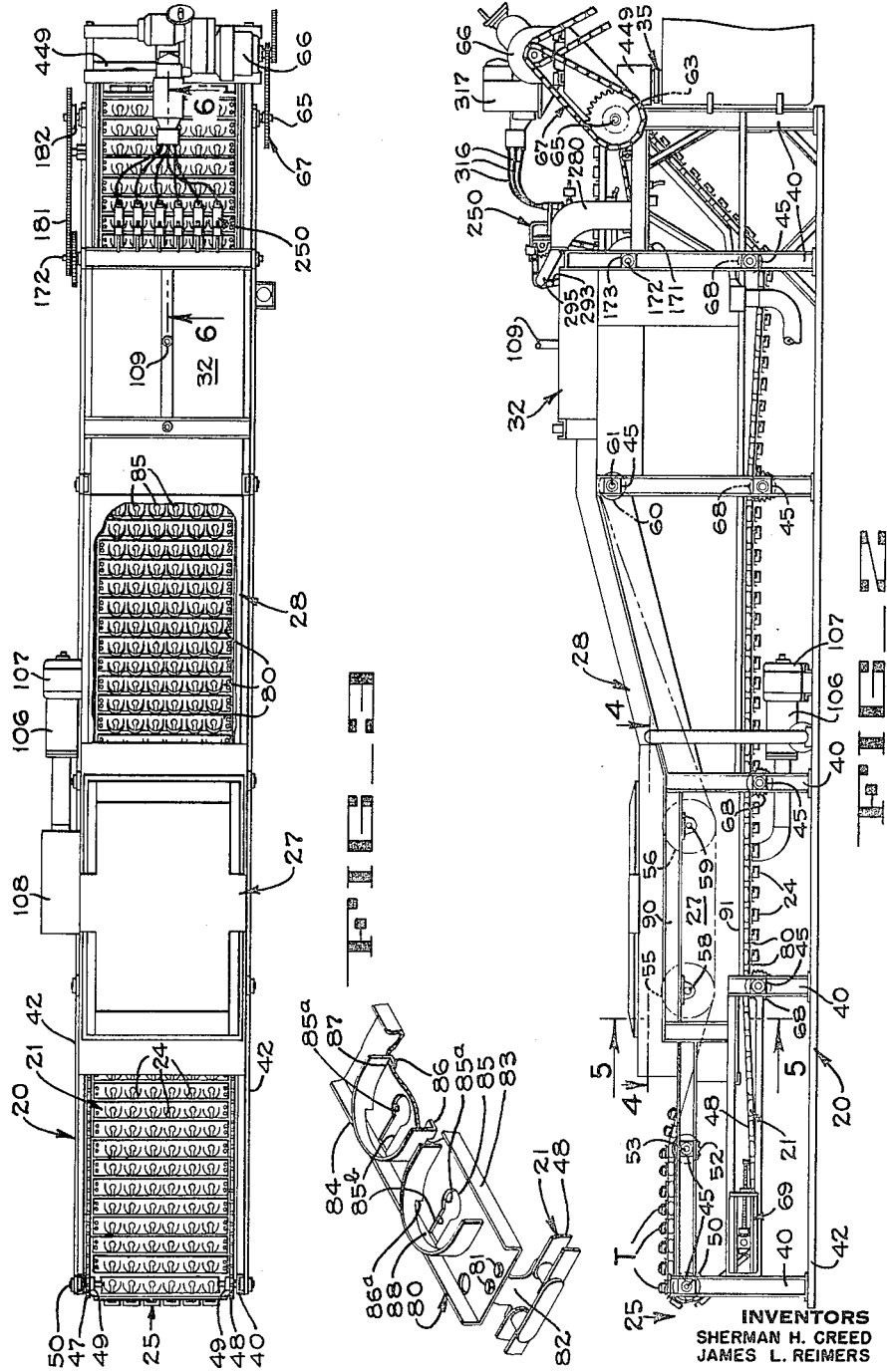

INVENTORS
SHERMAN H. CREED
JAMES L. REIMERS
ATTORNEY

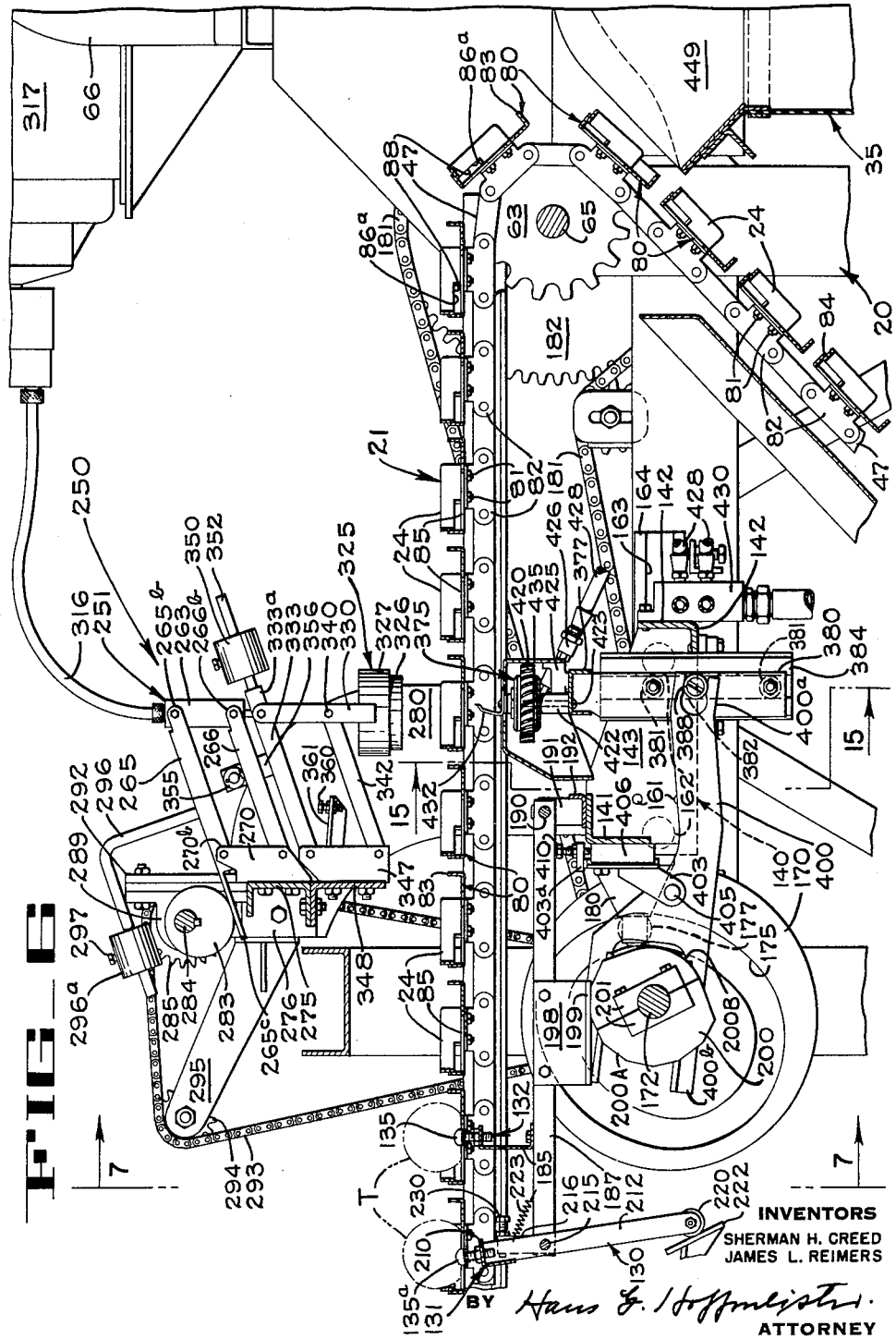

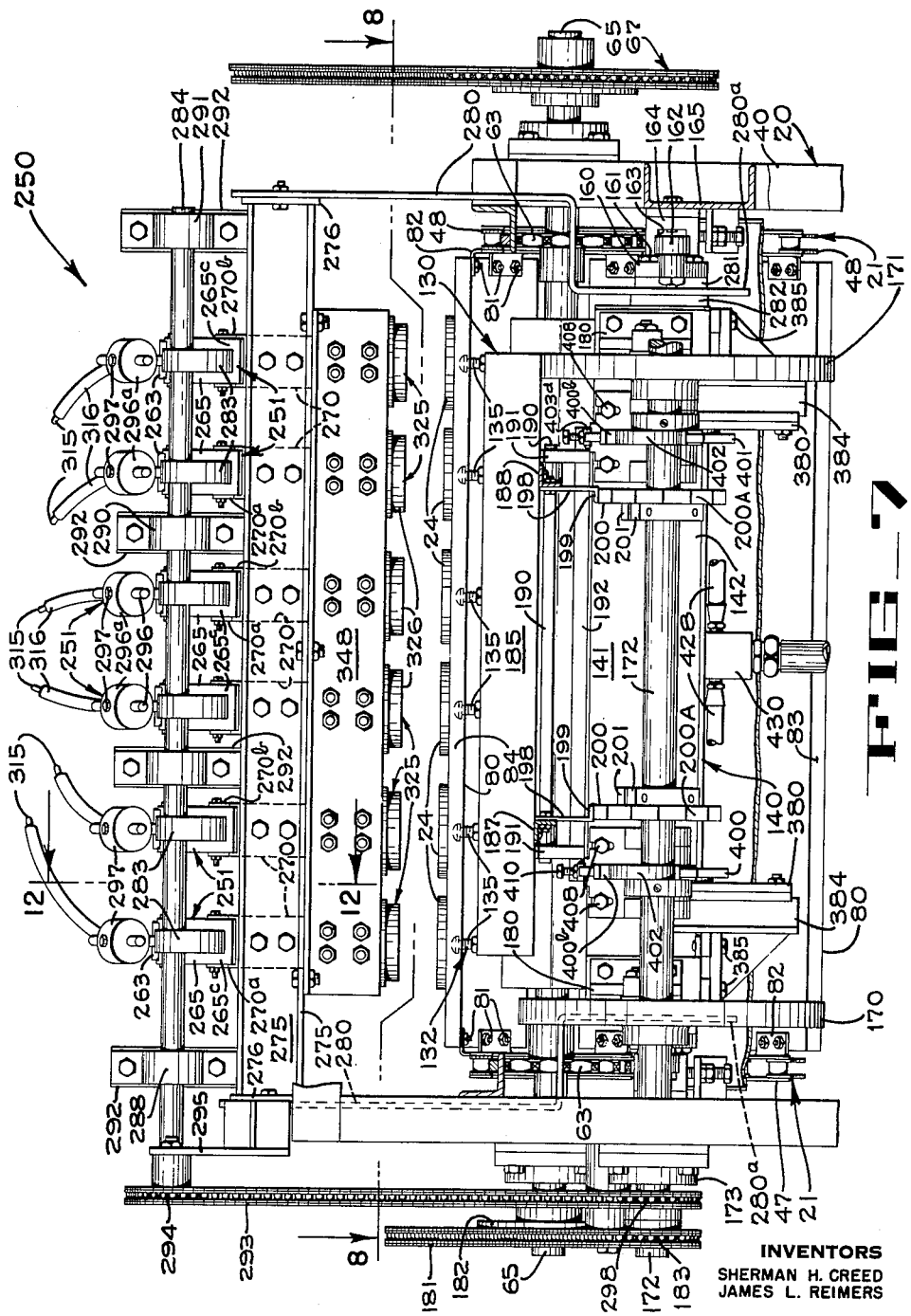

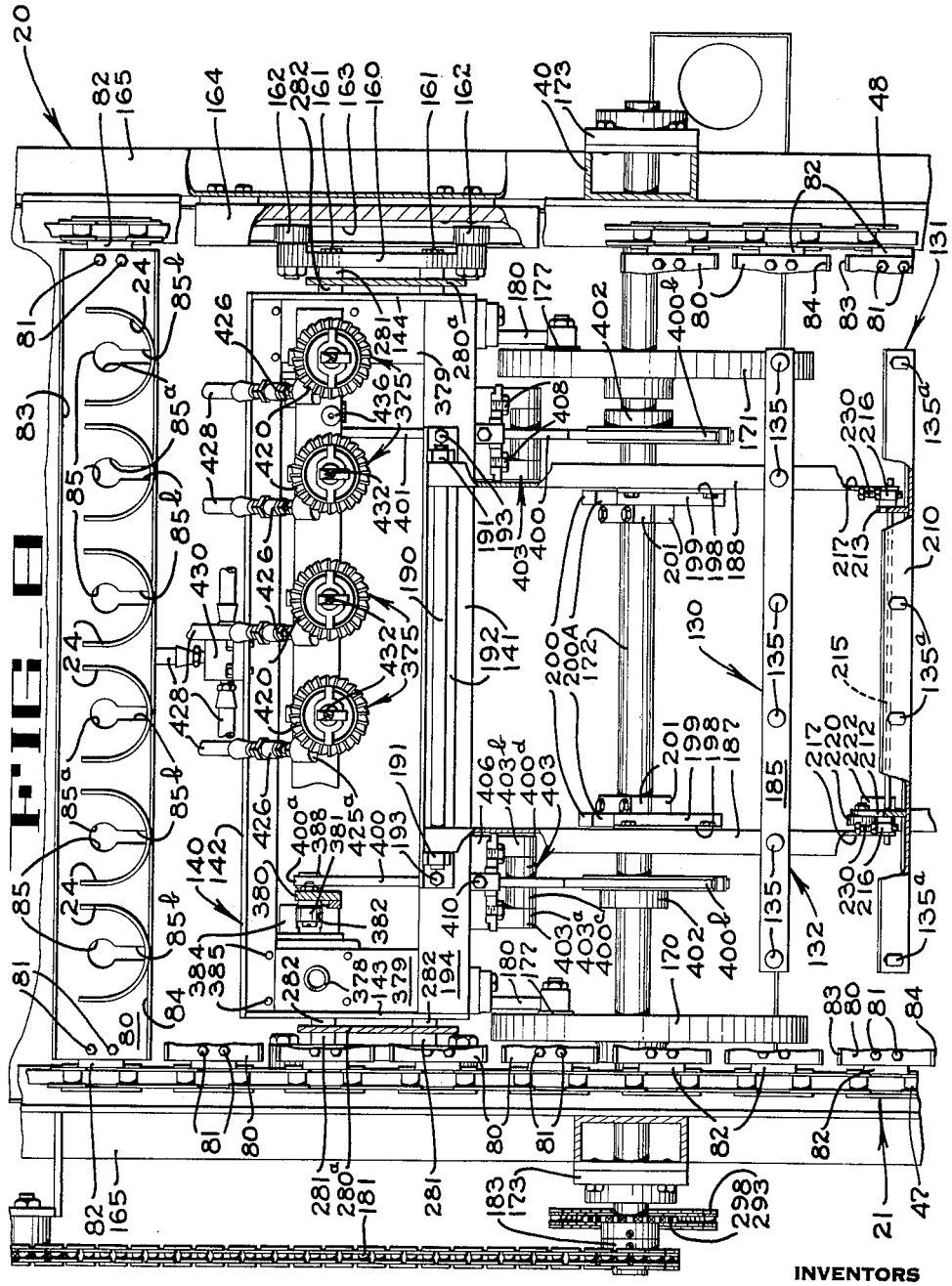

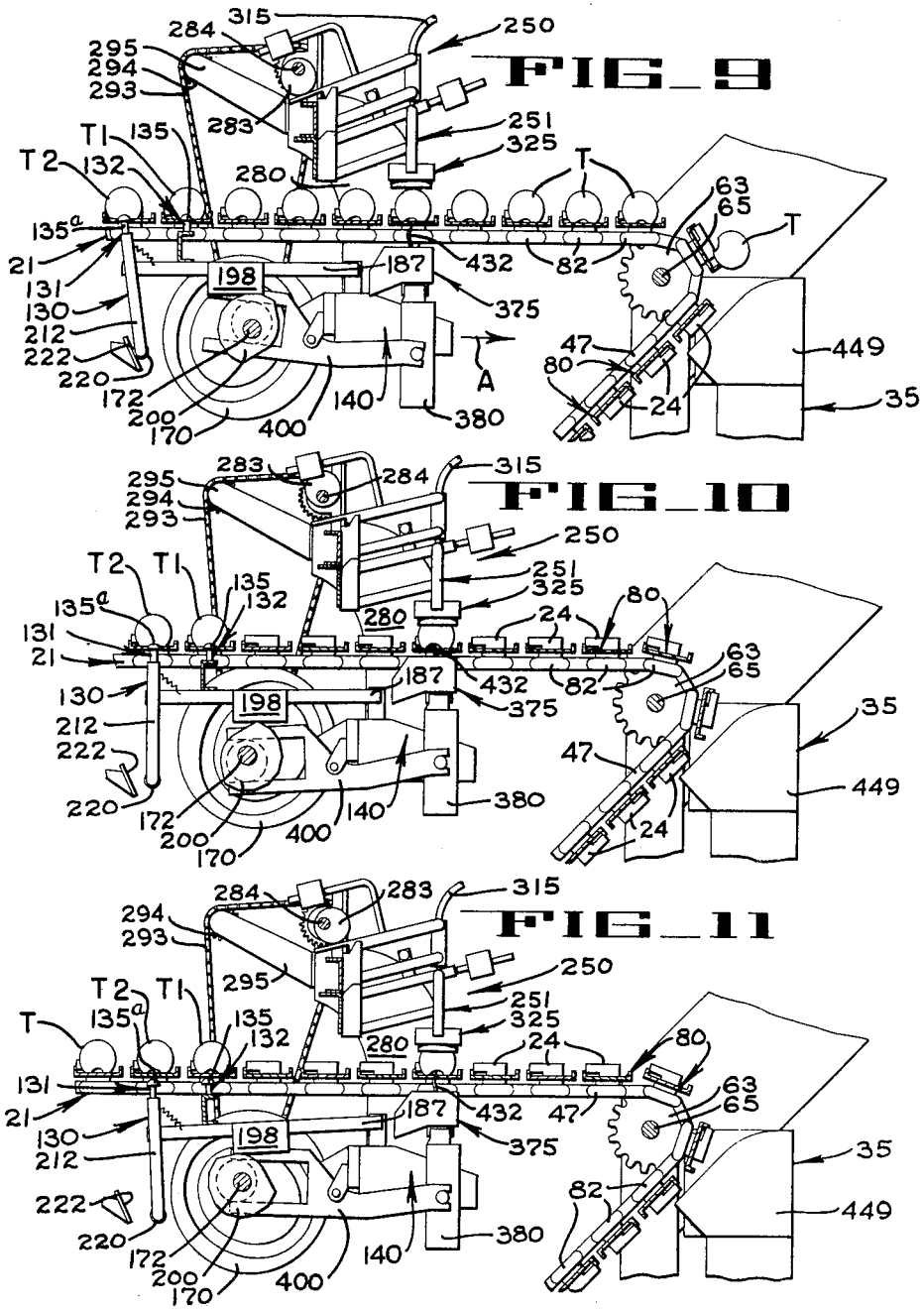

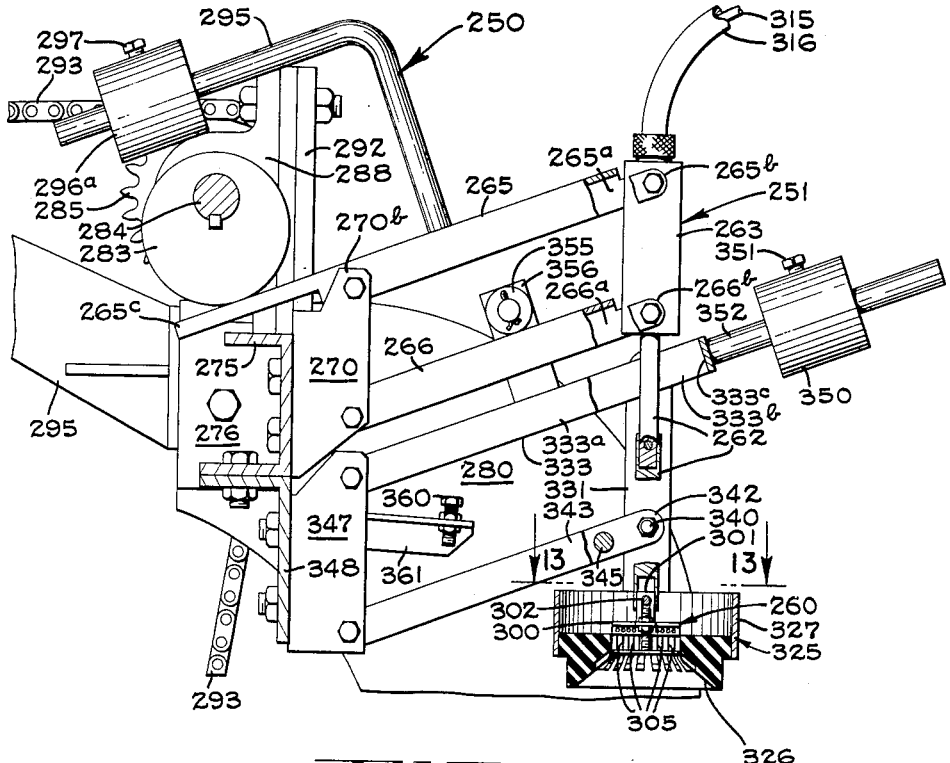
FIG_12
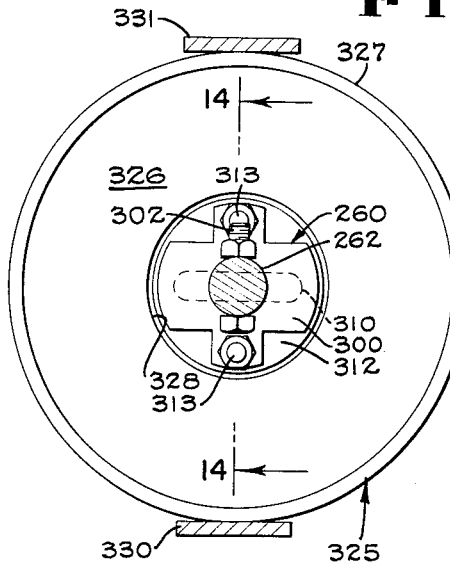
FIG_13
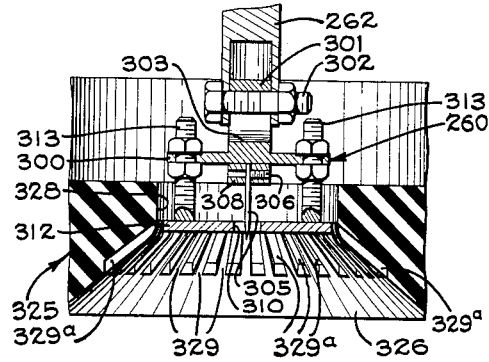
FIG_14
INVENTORS
SHERMAN H. CREED
JAMES L. REIMERS
BY Hans G. Hoffmeister
ATTORNEY Nov. 23, 1965    S. H. CREED ETAL    3,219,168
FRUIT ORIENTING APPARATUS
Original Filed Sept. 14, 1960    9 Sheets-Sheet 9
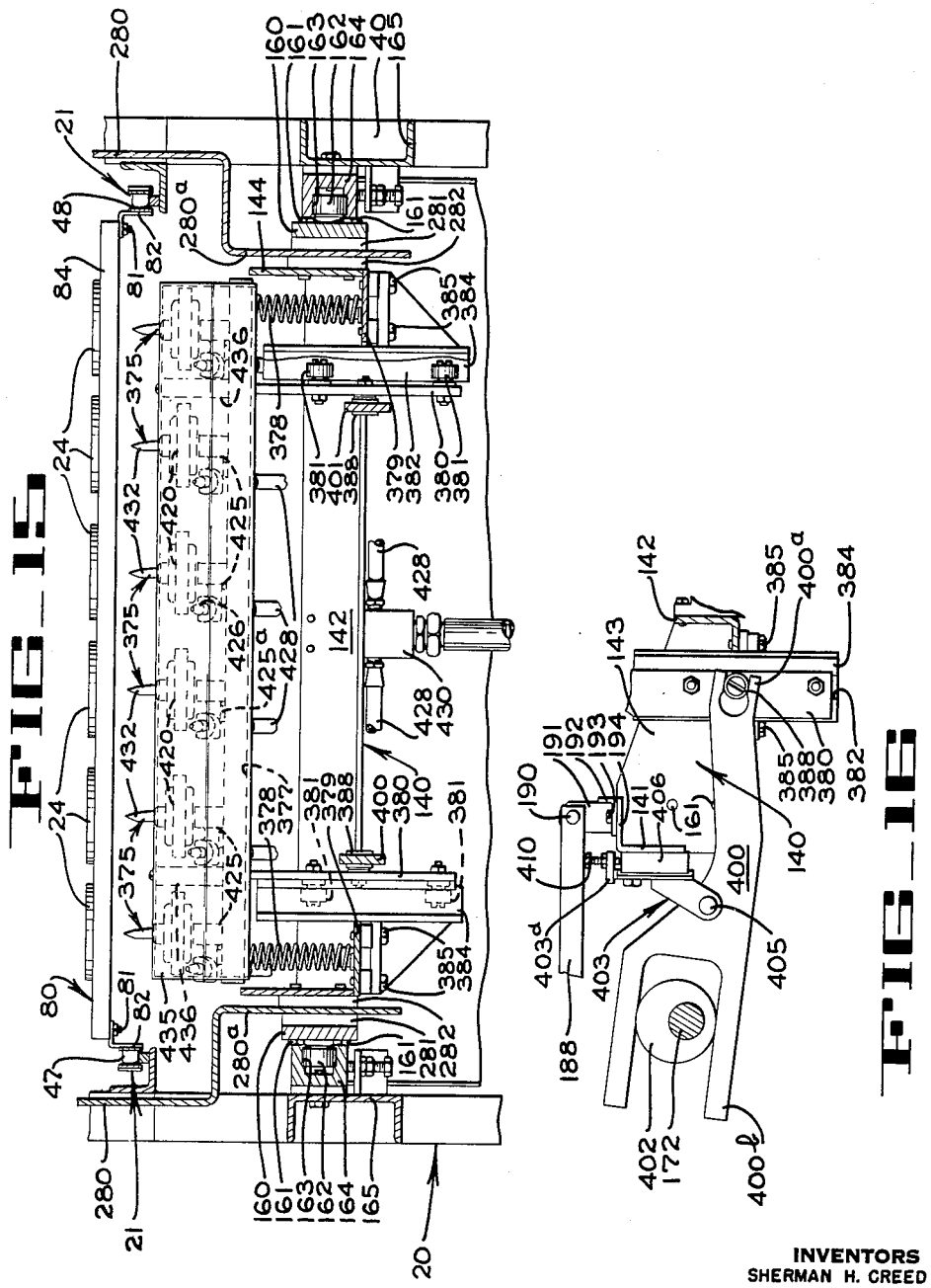
INVENTORS
SHERMAN H. CREED
JAMES L. REIMERS
BY Hans G. Hoffmeister
ATTORNEY 3,219,168
FRUIT ORIENTING APPARATUS
Sherman H. Creed and James L. Reimers, San Jose, Calif., assignors to FMC Corporation, a corporation of Delaware
Original application Sept. 14, 1960, Ser. No. 56,059, now Patent No. 3,096,800, dated July 9, 1963. Divided and this application Sept. 28, 1962, Ser. No. 250,196
5 Claims. (Cl. 198—33)

This application is a division of Sherman H. Creed et al., Serial No. 56,059, filed September 14, 1960, now Patent No. 3,096,800, July 9, 1963, for Apparatus for Processing Fruit, and assigned to the assignee of the present invention.

This invention relates to apparatus for processing fruit and more particularly relates to apparatus for centering fruit having an indent, preparatory for a subsequent cutting operation, such as a coring operation. Although the invention is not so limited, the embodiment of the invention to be described is an apparatus for centering fruit such as tomatoes by means of the stem indent of the fruit, in preparation for a subsequent coring and blossom end trimming operation.

Fruit such as tomatoes have a relatively soft body surrounded by a relatively thin fragile skin and must be delicately handled to avoid damaging of the body or meat portion of the fruit. Tomatoes have a stem which projects from what is termed an "indent," which indent is a concavity or recess in the general form of a concave surface of revolution, the axis of the surface being generally aligned with the core of the fruit. Opposite the stem end of the tomato is the blossom end of the tomato and among the operations required for preparing tomatoes for subsequent processing are those of removing the core and blossom of the tomato. These operations are usually performed after the skin has been treated so as to loosen it for a subsequent peeling operation. The apparatus of the present invention is of the type wherein the tomatoes are placed on a conveyor and are carried through a lye bath to loosen the skin and are then carried past a coring cutter and a blossom cutter, and after these operations are performed, the skin is removed and the tomato is ready for further processing.

In order to minimize waste by making it unnecessary to use an oversize coring cutter, the coring outer must be brought into engagement with the fruit when the fruit is positioned so that the axis thereof is aligned with the axis of the cutter. It is also desirable that the blossom cutter is aligned with the fruit axis. It is not practical to individually align the cutters with the fruit so the other alternative is employed, namely, the fruit is positioned on a moving conveyor so that, when it reaches the cutters, it will be in alignment therewith. Since conveyors usually involve chains or other flexible elements that might stretch or wear or both, and hence elongate with use, alignment of the fruit with the conveyor itself does not provide accurate alignment over a long period of time. For example, the spacing of fruit locating pins on chain mounted conveyor flights will gradually increase with the passage of time, due to wear in the chains and corresponding stretch or elongation of the conveyor. Since the only practical system is one wherein the operation of the cutters is timed by motion of the conveyor, this increased spacing of fruit centered relative to the conveyor, results in off centered coring.

It is an object of the present invention to align the fruit or position it on the conveyor before it reaches the cutters so that such alignment is performed, not relative to the conveyor, but relative to the cutters themselves. Briefly, this is accomplished by providing fruit centering means mounted upstream from the cutters and spaced from the cutters by a fixed predetermined distance which is equal to or is a multiple of the nominal or designed spacing of the individual conveyor flights or fruit support members. This reduces waste by permitting the use of a minimum size coring cutter.

In accordance with this invention, the fruit is placed on a conveyor flight or support plate with the stem cavity or indent down, and the centering means operates on the indent to center the fruit relative to the centering means. The centering means includes a pin, having a semispherical head, mounted below the conveyor flights, and means to project the pin up through an aperture in the flight and into contact with the tomato at its indent. Since the core of the fruit corresponds with the axis of the indent, this type of cenering aligns the core with the centering means. Furthermore, since the centering means is a fixed distance from the cutters, it is a simple matter to time the mechanism so that when the fruit reaches the cutters, the cutters will be aligned with the core or axis of the previously centered fruit.

As mentioned, tomatoes are fragile and are easily damaged, and this is particularly true after they have been subjected to a softening operation such as that employed for loosening the skin of the tomatoes preparatory to a peeling operation. Thus, the centering means should be one that performs its function without damaging the body of fruit and without penetrating the fruit and thereby providing a false centering action. Therefore, another object of the invention is to center the fruit accurately and gently. This is accomplished by providing one or more centering pins spaced from the cutters by a predetermined distance as mentioned above. Such centering pins are lifted vertically through apertures in the fruit carrier to engage the indents of the fruit. They rise sufficiently so that the fruit is disposed upon the centering pins at the fruit indents. The centering pins are then vertically vibrated so that, if the indents are not centered on the pins, that is, if the axis of the fruit does not correspond with the axis of the pins, there will be a force component from each centering pin that is normal to the surface of revolution forming the indent, which will shift the fruit until the axis of the fruit corresponds with that of the centering pin. When this occurs, no further shifting of the fruit will occur, and the fruit is positioned accurately relative to the cutters. The centering pin or pins can then be withdrawn to redeposit the fruit on the support plate, in a properly centered position. Of course, the depth of the indents of fruit such as tomatoes may vary from fruit to fruit so that a fruit with a shallow indent will be lifted further from the support than will one with a deep indent; but with the average run of fruit, the apparatus can be adjusted so that the lifting action is such that the fruit will be precisely centered by the centering pins. Actually, the fruit may cock somewhat so that one side of the peripheral portion surrounding the indent remains in engagement with the support while the diametrically opposite peripheral portion is lifted, but this does not interfere with the centering action, because functionally the fruit is disposed on, or supported by the centering pins during the centering operation. During the centering operation, the head of the centering pin and any portion of the apertured plate that may be engaged by a portion of the fruit at the edge of the indent form the sole fruit guiding means. Only fruits with exceptionally large indents, outside the range of adjustment of the machine, will not be perfectly centered, but even these will be approximately centered.

Accordingly, another object of the invention is that of delicately and precisely centering the fruit without creating any tendency to rotate or tumble the fruit, whereby the fruit will be left in centered position after the centering operation, with the stem end thereof facing down.

In some systems, an operation such as a skin softening operation may precede the centering and coring operations and this operation may cause the fruit to shift rearwardly on its support, the fruit having been shifted against a flange or rim on the supporting plate forming the conveyor flight. In other cases, the fruit may have been initially placed in a rearward position relative to a theoretical central position on the support. Another object of the invention is to provide, during the centering operation, an initial forward shifting of the fruit to bring it roughly into alignment with the theoretically correct position. This is accomplished by providing two centering pins, the first centering pin, that is, the first one to be reached by the fruit, is mounted so that in addition to providing the vertical lifting and vertical vibrating centering action described above, it has imparted thereto an additional forward shifting motion that brings the fruit, while disposed on the first pin, into the desired centered position on the conveyor. The centering action is then completed and made more precise when the fruit is brought over a second centering pin, which pin is fixed in the sense that it has no forward or rearward motion, but merely a vertical lifting and vertical vibratory motion.

Other objects of the invention are the provision of simple mechanism for synchronism or timing of the centering, coring and cutting mechanisms with the conveyor, so that the motion of the conveyor need not be interrupted during the performance of these operations.

Still another object of the invention is that of providing an improved reciprocating mounting mechanism for the units to perform the continuous or flying centering operation just described.

Another object of the invention is that of providing an improved fruit mounting plate having a rearward retaining wall and an elongated aperture so that fruit which may have been initially positioned off-center, or brought to an off-center position on the plate, can be shifted to a centered position by the forwardly shiftable centering pin disposed beneath the conveyor and extendable through the elongated aperture in the plate and into engagement with the indent of the fruit.

Other features and objects of the present invention will be apparent from the following description taken in connection with the accompanying drawings in which:

FIG. 1 is a plan view of the fruit processing machine of the present invention.

FIG. 2 is a side elevation of the machine of FIG. 1.

FIG. 3 is an enlarged fragmentary perspective of a portion of the conveyor of FIG. 1.

FIG. 6 is a fragmentary enlarged vertical section taken on line 6—6 of FIG. 1.

FIG. 7 is a vertical section, with parts broken away, taken on line 7—7 of FIG. 6.

FIG. 8 is a horizontal section, with parts broken away, taken along line 8—8 of FIG. 7.

FIGS. 9, 10 and 11 are schematic views showing the centering coring the trimming mechanisms used in the present machine, said views showing the mechanisms in consecutive operating positions.

FIG. 12 is an enlarged fragmentary vertical section taken on line 12—12 of FIG. 7.

FIG. 13 is an enlarged horizontal section taken on line 13—13 of FIG. 12.

FIG. 14 is a vertical section taken on line 14—14 of FIG. 13.

FIG. 15 is a vertical section taken on line 15—15 of FIG. 6.

FIG. 16 is a fragmentary side elevation of the portion of the mechanism shown in FIG. 6 with parts broken away and parts shown in section.

Figure 4:
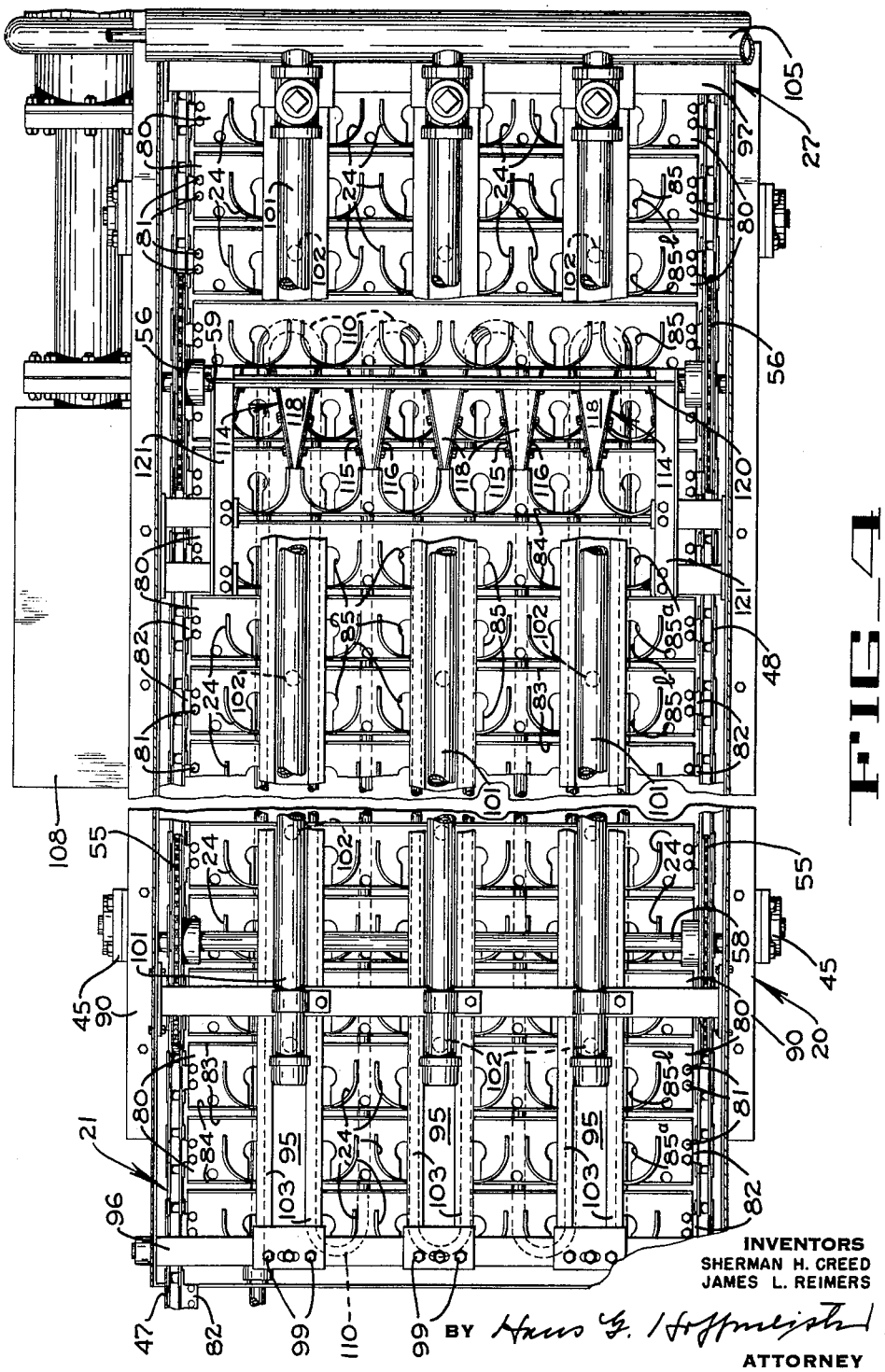
FIG. 4 is an enlarged fragmentary plan view of a portion of the machine of FIG. 1, looking in the direction indicated by lines 4—4 in FIG. 2, with the cover of the lye tank removed.

The tomato processing machine of the present invention comprises an elongated frame support structure 20 (FIGS. 1 and 2) on which is mounted an endless chain conveyor 21 having an upper run movable toward the right, as seen in FIG. 2, to carry tomatoes T, that are disposed in cups 24, through a series of processing stations. At a loading station 25, a tomato is placed in each cup with its stem end facing downwardly. As the tomato is carried to the right it passes into a tank 27 in which it is treated for a predetermined time with a solution of lye. After leaving the lye tank 27, the tomato is carried upwardly inside an inclined housing 28 in which excess lye is drained from the tomato, and the tomato is exposed to a steam atmosphere for a fixed period of time during which the lye on the skin penetrates to the desired depth to effect loosening of the skin from the flesh of the tomato body. The steam atmosphere in the housing 28 also raises the temperature of the tomato skin to a predetermined optimum peeling temperature. After leaving the housing 28, the tomato is moved through a section 32 wherein the tomato is first accurately centered, then a coring mechanism is moved upwardly into the stem end of the tomato to remove the core, and a trimming mechanism is carried downwardly to engage the blossom end of the tomato to sever the connection of the skin to the blossom end of the tomato. After these operations, the skin has been completely loosened from the flesh of the tomato body and has been separated from the stem and blossom ends of the tomato. The tomato is then discharged from the conveyor 21 and directed downwardly through a skin removing unit 35 where the skin is separated from the flesh of the tomato.

The support frame 20 is a welded structure comprising a series of spaced vertical channels 40 defining one side of the machine. Each of the channels 40 is directly opposite a similar vertical channel in a line of channels which define the opposite side of the machine. The vertical channels are bolted to floor channels 42 and are interconnected in conventional manner by suitable transverse and longitudinal braces. Bearing blocks 45 are mounted at several positions along the frame.

The chain conveyor 21 comprises two endless chains 47 and 48 each of which is trained around a sprocket 49 that is keyed to a transverse rotatable shaft 50 (FIG. 2). As it travels toward the right, the upper run of each chain is guided over a sprocket 52 keyed to a transverse rotatable shaft 53, then under two idler sprockets 55 and 56 which are keyed to two rotatable shafts 58 and 59, respectively, over an idler sprocket 60 which is keyed to a rotatable shaft 61, and around a drive sprocket 63 (FIG. 1) keyed to a drive shaft 65. A motor 66 is arranged to drive the shaft 65 through a chain and sprocket arrangement 67. The lower run of each of the conveyor chains 47 and 48 is held in substantially horizontal position by idler sprockets 68, and a typical chain tightener 69 is operatively associated with each chain.

In the present machine, each tomato is carried along in one of the cups 24. As seen in FIG. 1, six cups are mounted in a line extending transversely of the machine on a plate 80. The cups of the conveyor are also disposed one behind the other in lines extending longitudinally of the machine. Each transverse plate 80 is secured at each end by bolts 81 (FIG. 3) to a special link 82 provided on the adjacent conveyor chain 47 or 48. Each plate 80 has an upstanding leading edge 83, an upstanding trailing edge 84, and is provided with six keyhole-shaped openings 85, each of which has a circular portion 85a and a slotted portion 85b which extends to the trailing edge 84. Each cup 24 is made up of a strap-like member that has two lower edge portions 86, each of which projects through a slot 87 in the plate 80, and is bent upwardly against the underside of the plate to which it is secured as by welding. The cup, which is disposed around one of the keyhole openings 85, is open on its leading side and has a recess 86a, provided in its trailing wall portion, which cooperates with the plate 80 to define a drain port 88 through which the lye solution may escape.

The lye solution tank 27 (FIGS. 4 and 5) is a sheet metal structure which extends entirely across the support frame 20.

Figure 5:
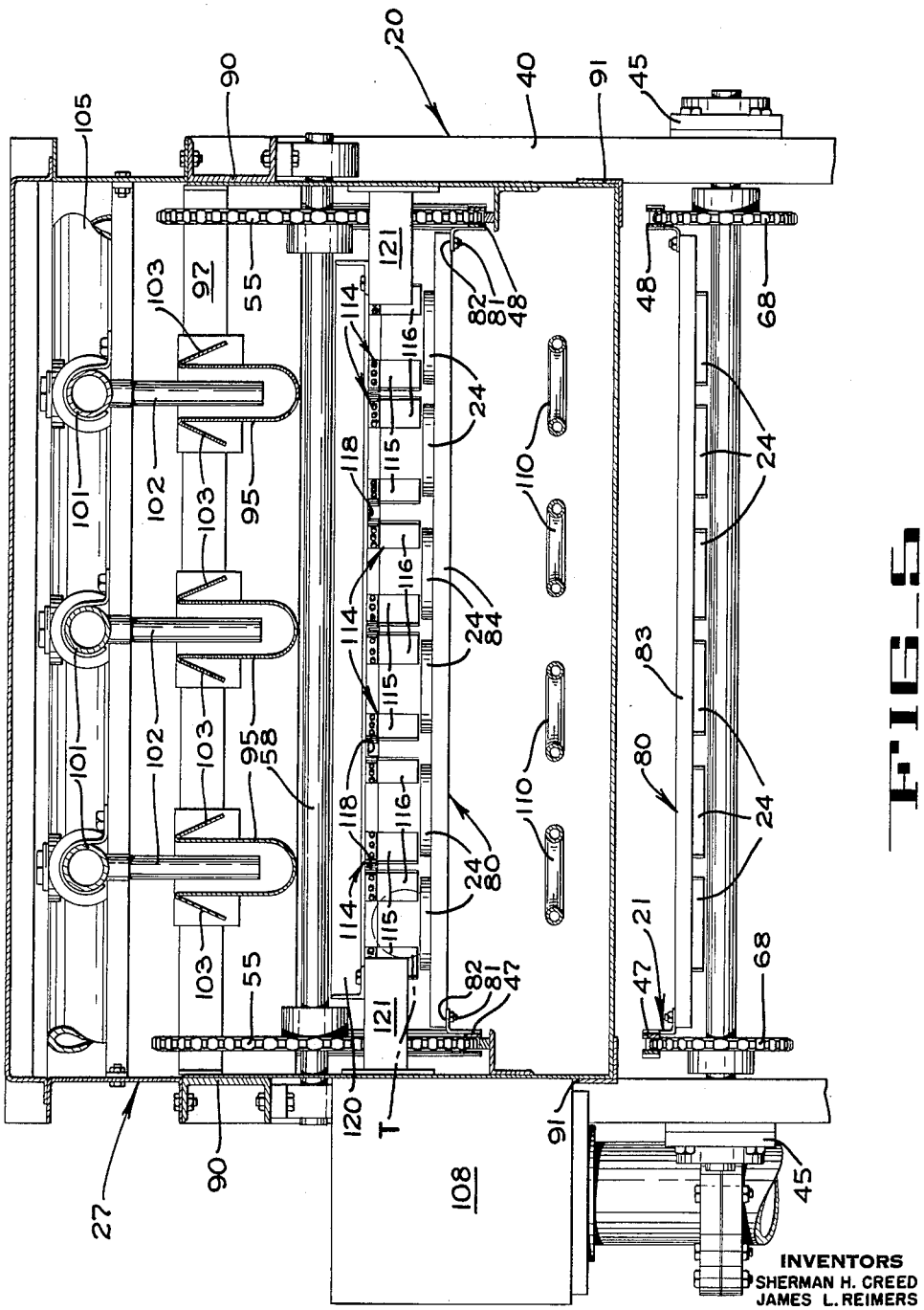
FIG. 5 is an enlarged vertical section taken on line 5—5 of FIG. 2.

The lye solution is also directed downwardly from three overhead troughs 95 (FIG. 5) which extend longitudinally of the tank, as seen in FIG. 4. A distributor pipe 101 (FIG. 5) is mounted above each trough and has several downwardly directed pipes 102 which fill the trough with lye solution. When the trough is full, the lye solution overflows onto downwardly and laterally slanted walls 103 of the trough, and each slanted wall 103 directs the lye solution onto one of the longitudinal lines of cups passing therebelow. The distributor pipes 101 are supplied by a header 105 which receives the lye solution from a pump 106 (FIG. 1) which is driven by a motor 107 and is connected on its suction side to a sump 108 (FIG. 5) of the lye tank. Steam coils 110 are mounted in the bottom of tank to heat the lye solution.

Near the outlet end of the lye tank, at a point where the conveyor chain 21 starts upwardly to lift the tomatoes out of the lye solution, a centering unit 114 (FIG. 5) is disposed above each longitudinal line of cups on the conveyor. Each centering unit 114 comprises a pair of vertical guide members 115 and 116 which are made of relatively rigid but yieldable material such as rubber or heavy canvas, and are secured in depending relation on triangular horizontal brackets 118 (FIG. 4) which are supported from a transverse bar 120 which is secured at each end to the side wall of the tank 27 by a bracket 121. Each pair of centering members 115 and 116 define a wedge-shaped passage through which a tomato must pass as it is lifted upwardly out of the lye solution. Since the tomato is still in a somewhat buoyant condition at this time, the centering members 115 and 116 move the tomato to the rear wall of the cup, and center the tomato in the cup. Then, when each tomato passes out of contact with the yieldable centering members and is out of the lye solution, it is in centered position in the rear of the cup.

When the tomatoes enter the processing section 32 of the machine, they are engaged by a second centering mechanism 130 (FIG. 6) which includes two transverse rows 131 and 132 (FIG. 8) of upwardly projecting pins or fingers 135 and 135a, respectively. The pins of row 131 engage and move the tomatoes disposed in one transverse row of cups toward a centered position, while the pins of row 132 perform a final centering operation on the tomatoes in a transverse row of cups that was previously acted on by the pins of row 131.

The two rows of centering pins perform their centering action while they are moving rearwardly in the machine (to the right in FIG. 6) in timed relation with the cups 24. This rearward movement of the centering pins is obtained by the connection of the pins to a movable housing or mounting member 140 (FIG. 6) which comprises a forward wall 141, a rear wall 142, and side wall members 143 and 144 (FIG. 8). Each of the side wall members 143 and 144 has a mounting plate 160 secured to it by bolts 161, and each plate 160 carries two rollers 162 that ride in a horizontal groove 163 formed in a guide member 164 that is secured to the inner face of a longitudinal channel 165 of the frame of the machine. Thus the four rollers 162 guide the housing for horizontal reciprocating movement in the frame of the machine.

Longitudinal reciprocation of the housing 140 is effected through two transversely spaced face cams 170 and 171 (FIG. 7) that are keyed to a transverse shaft 172 which is rotatably journaled in bearings 173 mounted on the frame structure. Each cam has a camming groove 175 (FIG. 6) adapted to receive a follower roller 177 which is rotatably mounted on an arm 180 bolted to the forward wall 141 of the housing 140. As seen in FIG. 6, the configuration of each camming groove 175 of each cam is such that, as the shaft 172 is rotated, the housing is reciprocated forward and back in the frame of the machine. The shaft 172 is driven through a chain 181 that is trained around a sprocket 182 on the drive shaft 65 and around a sprocket 183 (FIG. 7) keyed to the shaft 172.

The pins 135 of the transverse row 132 have rounded, segmental, spherical heads and have threaded shanks (FIG. 6) adjustably mounted in a transverse channel 185 which is bolted to two spaced longitudinal angle bars 187 and 188 (FIGS. 6 and 8), each of which is pivotally mounted at its forward end on a bar 190. The bar 190 is mounted in tabs 191 projecting upwardly from a plate 192 that is secured by bolts 193 to a rearwardly projecting flange 194 of the forward wall 141 of the housing 140. Intermediate its length, each of the angle bars 187 and 188 carries a plate 198 that has a generally horizontal flange 199 which rides along the upper surface of a split cam 200. The cam 200 has two hub portions 201 (FIG. 6) locked together around the shaft 172 by capscrews. The camming surface of the cam 200 has a portion 200A that is disposed relatively far from the shaft 172 and is provided with a plurality of relatively sharp peaks which engage the associated flange 199 and impart a vibrating action to the bar 187 or 188 as the pins move rearwardly, to the right in FIG. 6, in an elevated position. With this arrangement, the elevated pins of the row 132 are given a vibrating movement which is effective to cause tomatoes, disposed on the upper end of the pins, to assume a centered position thereon.

The pins 135a of the transverse row 131 have rounded heads that are flattened at the sides to permit the pins to move upwardly through the slots 85b of the keyhole openings in the plate 80. The pins of row 131 also have threaded shanks adjustably mounted in a transverse angle bar 210 (FIG. 6) that is welded to the upper ends of two upright bars 212 and 213 (FIG. 8). Each of the bars 212 and 213 is secured by a setscrew (not shown) to a rod 215 that is pivotally mounted near its opposite ends in bearing plates 216 welded to the vertical flange 217 of each of the pivotal angle bars 187 and 188. Thus, the vibrating action of the bars 187 and 188 also imparts a vibrating movement to the pins 135a of the transverse row 131 as they move rearwardly in an elevated position.

It will also be noted in FIG. 6 that the cam 200 has a curved camming surface 200B that has a central portion disposed relatively close to the shaft 172. This surface permits the pins to be lowered as they are moved toward the front of the machine during the reciprocating movement of the housing 140.

The upright bar 212 (FIG. 6) has a roller 220 rotatably mounted on its lower end. The roller is held against a fixed, slanted abutment plate 222 by the action of a tension spring 223 that is connected between the upper end of bar 212 and the angle bar 187. As the vibrating pin assemblies are moved rearwardly, or to the right in FIG. 6, the spring 223 pivots the arm 212 and the rod 215, to which the arm 212 is keyed, in a clockwise direction until the arm 212 abuts the end of an adjusting bolt 230 that is threaded through the upper end of the bearing plate 216 welded to bar 187. The bolt 230 is so adjusted that the pivoting movement of the bar 212 is stopped when the pins 135 of the rear row 131 are in vertical position. When the rows of pins are moved toward the front of the machine during reciprocation of the housing 140, the slanted abutment plate 222 causes the arm 212 to be pivoted counterclockwise (FIG. 6) bringing the pins 135a of row 131 to the tilted position of FIG. 6.

A cycle in the operation of the second tomato centering mechanism 130 is illustrated in FIGS. 9, 10 and 11. In FIG. 9 the housing 140 has already started its rearward movement in the direction of arrow A under the control of cams 170 and 171. The cams 200 have raised each centering pin of row 131 upwardly through the slotted portion 85b of one of the keyhole openings 85 (FIG. 3) in cup support plate 80 to engage a tomato T2 (FIG. 9) which, at this time, is disposed in the trailing part of the associated cup. The pins of row 132 have been moved upwardly to engage a tomato T1 in the row preceding the row of tomatoes T2. As the housing 140 continues its rearward movement the cams 200 vibrate the arms 187 and 188 on which the centering pins are mounted. With this arrangement each tomato automatically centers itself on a centering pin 135 and 135a. Also, as the housing 140 moves rearwardly, the bar 212 is pivoted to upright vertical position by the spring 223 to shift the tomato T2 and center it relative to the aperture 85a of the support plate 80. Therefore, when the housing 140 reaches the position of FIG. 10, the tomato T2 is centered in the cups and the tomato T1 has been further centered by the pins of row 132. When the cams 200 continue their rotation from the position of FIG. 10, the centering pins are lowered and then the housing starts its return movement toward the front of the machine as seen in FIG. 11.

After the tomatoes in a particular transverse line of cups have been centered, they are moved under a blossom end trimming mechanism 250 (FIG. 6) which comprises six individual trimming units 251, one unit being disposed in vertical alignment with each longitudinal line of tomato centering cups. Each unit 251 comprises a cutter head 260 (FIG. 12) secured to the lower end of a rod 262 that is rotatably journaled in a bearing housing 263. The bearing housing 263 is pivotally mounted between arms 265a and 265b of a lever 265 and between arms 266a and 266b of a lever 266. The levers 265 and 266 are disposed in parallel relation and are pivotally mounted at their inner ends between two spaced flanges 270a and 270b (FIG. 7) of a bracket 270 that has a flat central portion bolted to the vertical face of a channel member 275 which is mounted transversely of the machine and has a flange mounted for vertical motion by pivoted arms 265, 266, the other ends of which are carried by a plate 280, mounted on the reciprocating housing 140. The cutter heads 260 are each vertically and individually reciprocated by eccentrics 283 (FIG. 12), mounted on a shaft 284 (FIG. 7), driven by a chain 293 from the machine drive shaft 172. A balanced weight 296a is mounted on each cutter head assembly.

Each cutter or trimmer head 260 includes a plate 300 (FIGS. 13 and 14) mounted on the rotatable rod 262 and carving blossom trimming cutter pins 305. The pins project through an adjustable gage plate 312 that determines the depth of cut. The cutter rod 262 is driven by a flexible shaft 315 and the motor 66 (FIG. 6) through a transmission 317.

Each cutter head 260 has an independently mounted rubber tomato hold down ring 325 (FIGS. 12 and 14), secured to vertical straps 330, 331 (FIGS. 12 and 13) which are supported on links 333, 342, the other ends of which are also supported by plate 280. The hold down cup is lifted by a roller 355 (FIG. 12) secured to link 333 and engaged by the cutter support link 266. A weight 350 lowers the hold down ring 325. The operation of the blossom trimmer forms no part of the present invention, and is described in detail and claimed in the copending application of Creed et al., Serial No. 250,197, filed September 28, 1962, which is also a division of the aforesaid patented parent application.

While the blossom end cutter unit engages the blossom end of the tomato, a coring unit 375 (FIG. 6) is moved upwardly to penetrate and core the tomato. A plurality of these coring units 375, which will now be explained with reference to FIGS. 6 and 15, are mounted on an inverted channel 377 which extends transversely of the machine. Adjacent each end of the channel 377 a compression spring 378 is disposed in supporting relation between the channel 377 and a wall of the housing 140 (FIG. 15).

The coring unit is mounted for independent vertical reciprocation in the longitudinally reciprocable housing 140 by means of rollers 381 carried by brackets 380 depending from the channel 377, and riding in vertical tracks 382 carried by housing 140.

The coring units 375 are vertically reciprocated by cranks 400, 401 (FIGS. 15 and 16) pivotally mounted on the housing 140 at 405, and operated by eccentrics 402 carried by the shaft 172. This motion is timed with motion of the blossom trimming units 351 and the centering pins 135.

Each coring cutter or knife 432 is rotated by a turbine rotor 420 (FIG. 6) attached to the cutter shaft, and an air nozzle 426, connected to a compressed air source through lines 428.

It will be understood that, during operation, the hold-down ring 325 engages the blossom end of the tomato first to hold it in fixed, non-rotating position. The blossom end cutter head 260 and the coring knife 432 then engage the tomato, approximately at the same time, to trim the blossom end and core the tomato.

After being trimmed and cored the tomatoes in each transverse line of cups are carried around the discharge end of the conveyor 21 where each tomato is dumped into a sheet metal chute 449 which directs the tomato into one of three skin-removing units 35.

To put the machine in operation, the pump motor 107 (FIG. 2) is energized to begin the circulation of the lye solution in tank 27, and the motor 66 is energized to rotate the cutter head of each blossom end trim unit 251 and drive the shafts 65 and 172. Rotation of shaft 65 causes movement of conveyor 21, and rotation of shaft 172 causes reciprocation of the housing 140, the raising, lowering and vibrating of the centering pins 135 and 135a, the raising and lowering of the blossom end trimming units 251, and the raising and lowering of the coring units 375.

At the feed station 25, the operator places a tomato stem end down in each cup 24. As the tomato is carried through the lye tank 27, its lower portion passes through the lye solution while lye is directed downwardly onto the tomato from the overhead troughs 95. Just as the tomato is raised upwardly out of the lye solution, it moves into the wedge-shaped passage provided by the two slanted centering members 115 and 116. These centering members move the tomato to a centered position at the rear end of the cup 24. As the conveyor moves upwardly through the housing 28, the heated vapor in the housing maintains the lye coating on the tomato at a temperature such that the lye will weaken the skin and loosen it from the flesh under the skin. Excess lye drains out of the cup through the drain port 88 and is directed back to the tank.

When the tomato enters the processing zone 32 it is first engaged by a pin 135a of a row 131. This pin is moved upwardly through the slot 85b of the keyhole opening 85 and into the stem indent of the tomato. As the pin is pivotally moved to the upright position of FIG. 10, the tomato is vibrated and moved to a centered position in the cup. The pin 135a is then lowered and moved back toward the front of the machine to a position under a tomato in the row of tomatoes next behind. When the centering pins are again elevated, the pins 135 of row 132 move up into the previously centered tomato and the tomato is once more agitated and centered.

As the tomato is moved farther along the machine, it comes into a position between a blossom end trimming unit 251 and a coring unit 375, which are moving in a circuitous path due to the reciprocation of the housing 140, the rotation of eccentrics 283 and 402. The hold-down ring 326 of the unit 251 engages and centers the tomato in the cup and prevents rotation of the tomato while the cutter head 260 cuts into the blossom end of the tomato and the coring knife 432 cores the tomato. After the tomato has been cored and trimmed, it is carried to the end of the conveyor 21 where it is directed downwardly through the skin removing unit 35.

From the foregoing description it will be noted that the present invention provides a machine for precisely centering tomatoes or similar fruit, preparatory for a coring or trimming operation, or for both.

It will be understood that modifications and variations of the invention disclosed herein may be made without departing from the scope of the present invention.

Having thus described the invention, what is claimed as new and is desired to be protected by Letters Patent is:

1. In a fruit processing machine, a conveyor having a support surface with a hole elongated in the direction of movement of said conveyor, said surface being arranged to advance a fruit placed stem end down over the hole, a lever mounted below said conveyor for pivotal movement longitudinally of said conveyor, a centering pin on the upper end of said lever, means for reciprocating said lever forwardly and rearwardly in a direction longitudinally of said conveyor, means for raising and lowering said lever in timed relation with the reciprocation of said lever, a spring connected to said lever to pivot said lever to a vertical position during forward movement of said lever, and an abutment member mounted below said conveyor in the path of movement of one end of said lever as said lever is moved rearwardly whereby to pivot said lever to an inclined position against the resistance of said spring.

2. In a machine for processing fruit, a conveyor movable along a predetermined path, a fruit carrier mounted on said conveyor and having a support formed with a hole therein, said support being arranged to support a fruit placed stem end down with the stem disposed over the hole, a centering pin disposed below said conveyor and below said hole, means mounting said centering pin for synchronized movement with said conveyor, and means mounting said pin for swinging movement upwardly through the hole and rearwardly relative to said support in the direction of movement of said conveyor to engage a fruit on said support and move it rearwardly in said carrier.

3. In a machine for processing fruit, an endless chain conveyor having an apertured fruit carrier arranged to advance a fruit placed stem end down with the stem disposed over the aperture, a mounting member mounted below the upper run of said conveyor for reciprocating movement longitudinally of the conveyor, a centering pin mounted below the upper run of said conveyor, a rod pivotally connected to said centering pin and to said reciprocating member, a shaft mounted for rotation adjacent an intermediate portion of said rod, a cam on said shaft, means providing a cam follower on said intermediate rod portion, means defining a camming surface on said cam in contact with said follower, said camming surface being arranged to raise said centering pin through the aperture in the carrier, vibrate said pin, and lower said pin during each revolution of said shaft, and means including said shaft for reciprocating said mounting member in timed relation with the raising and lowering of said centering pin.

4. In a fruit processing machine, an endless chain conveyor including a plurality of transverse fruit support plates, means defining a hole in each plate, each hole being elongated in the direction of movement of said plates, a retaining wall secured in upright position on each of said plates, each wall being laterally centered with respect to the associated hole with the rear edge of the associated elongated hole terminating adjacent a portion of said wall, and centering means movable upwardly and rearwardly relative to said plate through said elongated hole to engage a fruit on said plate and shift it relative to said plate.

5. In a fruit processing machine, a conveyor having a fruit support with a hole formed in said support, said hole being elongated in the direction of movement of said conveyor, said support being arranged to advance a fruit placed stem end down with the stem disposed over the hole, a lever mounted below said conveyor for pivotal movement longitudinally of said conveyor, a centering pin on the upper end of said lever, means for reciprocating said lever forwardly and rearwardly in a direction longitudinally of said conveyor, and means for raising and lowering said lever in timed relation with the reciprocation of said lever.

References Cited by the Examiner

UNITED STATES PATENTS 2,568,947   9/1951   Carroll _____ 198—33
2,907,440   10/1959  Hait.

SAMUEL F. COLEMAN, *Primary Examiner.*

EDWARD A. SROKA, *Examiner.*